United States Patent [19]

Na

[11] Patent Number: 5,668,617

[45] Date of Patent: Sep. 16, 1997

[54] THIN FILM-LIQUID CRYSTAL DISPLAY PANEL AND MANUFACTURING METHOD THEREOF

[75] Inventor: Kyoung-won Na, Seoul, Rep. of Korea

[73] Assignee: Samsung Display Devices Co., Ltd., Kyungki-do, Rep. of Korea

[21] Appl. No.: 590,820

[22] Filed: Jan. 24, 1996

[30] Foreign Application Priority Data

Jan. 27, 1995 [KR] Rep. of Korea .................. 95-1585

[51] Int. Cl.$^6$ .................. G02F 1/1339; G02F 1/1341
[52] U.S. Cl. .................. 349/156; 349/138; 349/189
[58] Field of Search .................. 359/62, 79, 81, 359/82, 83, 900; 428/1; 430/20; 349/122, 123, 138, 155, 156, 187, 189

[56] References Cited

U.S. PATENT DOCUMENTS

| | | |
|---|---|---|
| 4,653,864 | 3/1987 | Baron et al. .................. 349/156 |
| 5,005,951 | 4/1991 | Te Velde .................. 359/81 |
| 5,268,782 | 12/1993 | Wenz et al. .................. 359/81 |
| 5,365,356 | 11/1994 | McFadden .................. 359/81 |
| 5,414,545 | 5/1995 | Lee .................. 359/81 |
| 5,459,598 | 10/1995 | Carrington .................. 359/81 |

*Primary Examiner*—William L. Sikes
*Assistant Examiner*—Tai V. Duong
*Attorney, Agent, or Firm*—Leydig, Voit & Mayer

[57] ABSTRACT

A thin-film liquid crystal display panel and a manufacturing method thereof in which an upper protection layer and a cell gap are formed by using a thin-film manufacturing technique usually used in the manufacture of semiconductors. The thickness of the cell gap is easily controlled, and the liquid crystal layer is uniformly formed. Therefore, a liquid crystal display panel with excellent liquid crystal driving capability is obtained.

9 Claims, 4 Drawing Sheets

THIN FILM-LIQUID CRYSTAL DISPLAY PANEL AND MANUFACTURING METHOD THEREOF

BACKGROUND OF THE INVENTION

The present invention relates to a thin-film liquid crystal display panel, and more particularly, to a thin-film liquid crystal display with liquid crystal cell dimensions greatly reduced thickness is uniform but whose weight and volume. The present invention also relates to a method of manufacturing a thin-film liquid crystal display.

As for image display devices currently in use, there are cathode-ray tubes (CRTs), flat liquid crystal displays (LCDs), flat plasma display panels (PDPs), to name a few. Here, the CRT excels in picture quality and brightness, but is too large and too heavy to apply to the current trend to develop large-screen displays.

On the other hand, a flat display device has an advantage in that its dimensions and weight are small and light, respectively, as compared to the CRT, and, thus, is widely being used in various fields. Liquid crystal has been used prevalently since it has the unique characteristics of easy use and is capable of changing its crystal arrangement according to whether an outer electric field is applied or not.

FIG. 1 is a perspective view of a typical liquid crystal display panel. In a typical manufacturing method, ITO (indium tin oxide) electrodes 13 and 19 are respectively formed on two substrates 11 and 11' and then insulating layers 14 and 14' are formed on the whole surface of the resultant structures. The two structures are joined by sandwiching spacers (not shown) between the insulating layers 14 and 14', with the resultant structure having the substrates on the outside. Next, through a method of liquid crystal injection, liquid crystal layer 15 is formed between the insulating layers, completing the formation of a liquid crystal display panel.

The basic driving principle of a liquid crystal display utilizes the characteristics that a liquid crystal's arrangement changes according to whether an outer voltage is applied or not, and light incident upon this liquid crystal layer is either cut off or transmitted on the application of the voltage. Referring to FIG. 1, if a voltage is applied between the upper and lower electrodes 13 and 19, an electric field is formed on liquid crystal layer 15. The electric field formed on the liquid crystal layer orients the liquid crystal to align in one direction, and light incident on the liquid crystal layer of the display device is either cut off or transmitted according to the alignment of the liquid crystal. Such a driving characteristic of the liquid crystal is influenced by the thickness and uniformity of the liquid crystal layer formed within the liquid crystal display panel.

In a conventional liquid crystal display the cell gap is typically formed by depositing a spacer material onto the lower substrate structure and then connecting the upper substrate structure thereon, resulting in non-uniform cell gaps. Because the diameters of the particles of the spacer material are not equal, it is difficult to form a cell gap of uniform thickness as well as to precisely control the thickness of the cell gap formed by particle sizes of the spacer material. This creates a problem in that the conventional liquid crystal display device has poor optical cut-off and transmission characteristics.

SUMMARY OF THE INVENTION

It is an object of the present invention to provide a liquid crystal display panel whose liquid crystal layer is consistent, thereby providing for excellent cut-off and transmission of light.

In order to accomplish the above object, there is provided a thin-film liquid crystal display panel according to the present invention. The thin-film liquid crystal display panel comprises a substrate on which an electrode pattern is formed, an insulation layer spaced by a predetermined distance from the substrate, a plurality of legs protruding from the insulation layer and contacting the substrate, and a liquid crystal layer disposed between the substrate and the insulation layer.

It is another object of the present invention to provide a method for manufacturing a thin-film liquid crystal display panel which can smoothly control the thickness of a cell gap and form a uniform liquid crystal layer.

To accomplish this object, a method of manufacturing a liquid crystal display panel according to the present invention, comprises the steps of:

(A) forming an electrode pattern on a substrate;

(B) forming a metal thin-film on the substrate having said electrode pattern formed thereon;

(C) etching the metal thin-film to form grooves;

(D) filling the interior of the groove with a transmissive insulation material, and forming an upper insulation layer on the metal thin-film; (E) (E) forming an upper electrode pattern on the upper insulation layer;

(F) forming a liquid crystal injecting hole in the upper insulation layer;

(G) dissolving the metal thin-film layer to form a uniform cell gap and then injecting a liquid crystal into the cell gap; and (H) forming a protection layer on the liquid crystal injecting hole and the upper electrode pattern.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

In the present invention, a cell gap and a upper electrode are formed by a thin-film manufacturing process similar to that used for manufacturing semiconductor devices. This process is different from the conventional method of forming the liquid crystal cell gap. In this process liquid crystal is injected by connecting the upper and lower substrates to each other. The method of the present invention has an advantage in that it allows for the desired uniform thickness of the cell gap to be easily and accurately formed.

FIG. 2A through FIG. 2I are perspective views for explaining the sequential process for manufacturing a thin-film liquid crystal display panel according to an embodiment of the present invention. With these figures, detailed characteristics of this process will be explained.

Figure 1:
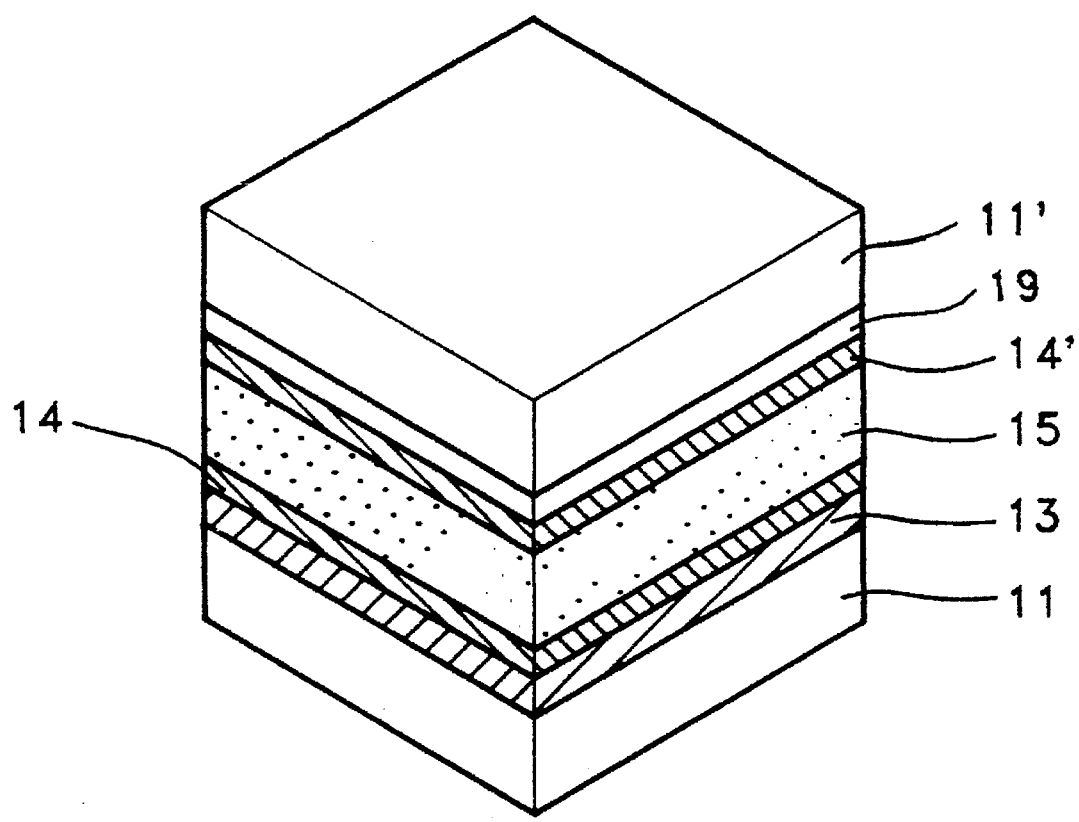
FIG. 1 is a perspective view of a liquid crystal display manufactured by a conventional method.
Figure 2A:
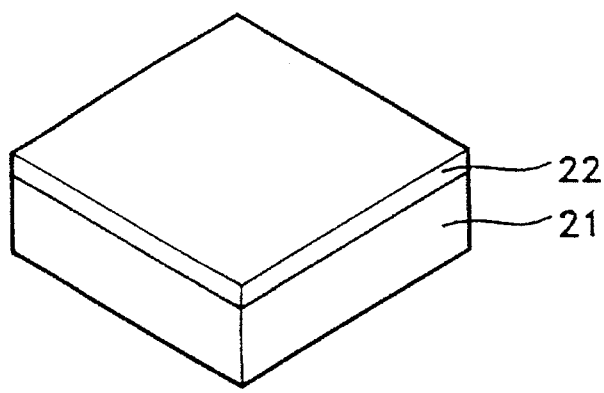
FIGS. 2A through 2I are perspective views illustrating the sequential process for manufacturing a thin-film liquid crystal display panel according to an embodiment of the present invention.
Figure 2B:
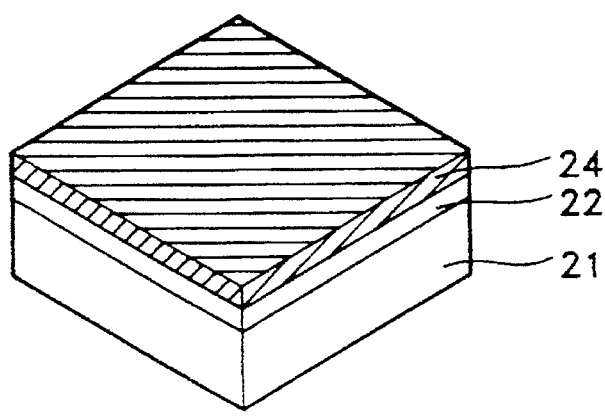
Figure 2C:
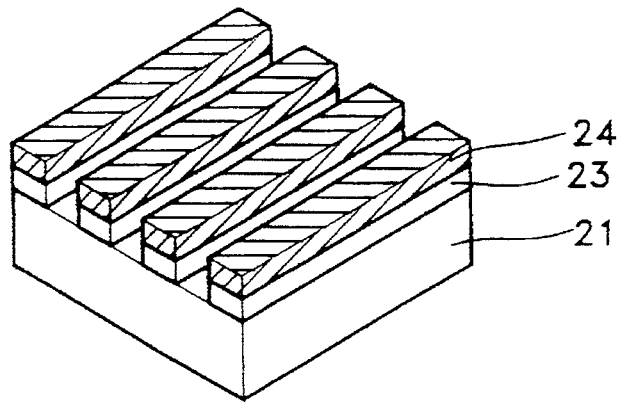

First, a substrate 21, on which a conductive material layer 22 is formed, is cleaned and prepared (FIG. 2A). Next, a photoresist 24 is deposited on the conductive material layer 22 and developed (FIG. 2B). Then, a lower electrode pattern 23 is formed on the substrate 21 by etching the conductive material layer 22 (FIG. 2C).

Figure 2D:
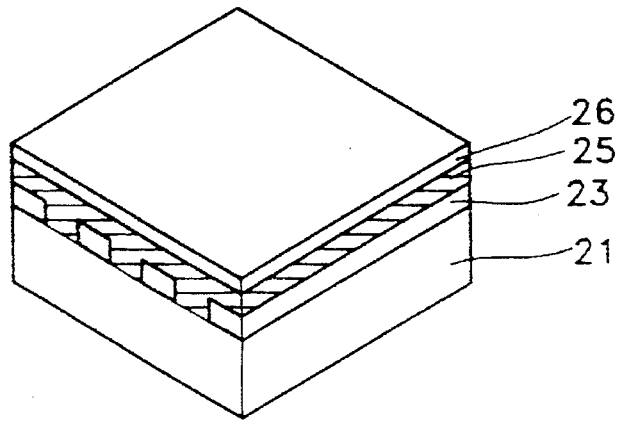
Figure 2H:
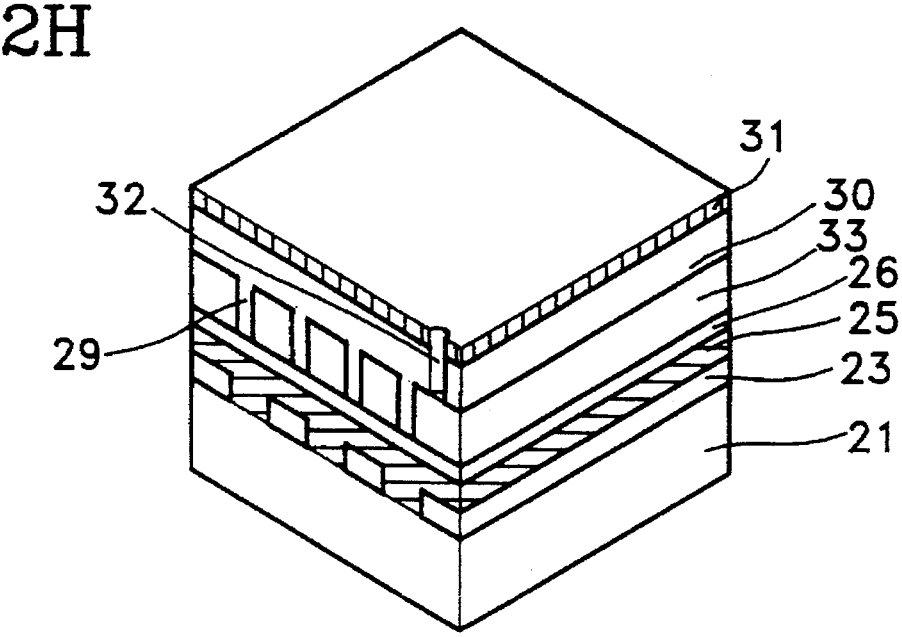
Figure 2I:
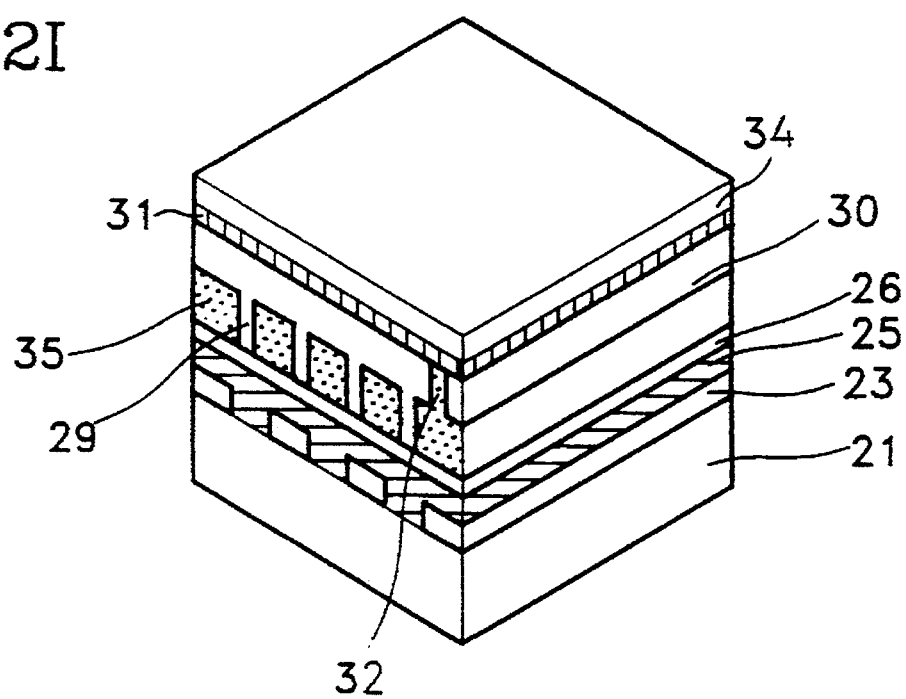
Figure 2E:
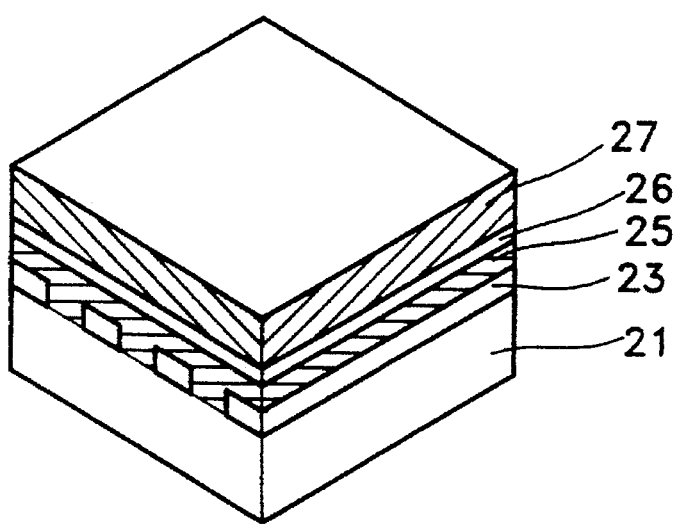

Next, the photoresist 24 is removed, and a lower insulation layer 25 is formed, using a material such as $SiO_2$, by a chemical vapor deposition (CVD) or a sputtering method, and then a liquid crystal alignment layer 26 is formed with a material such as polyimide (FIG. 2D). By using the sputtering or evaporating method to form a cell gap for injecting a liquid crystal material, a soluble metal thin-film layer 27 is formed to the desired cell gap thickness on the formed alignment film 26 (FIG. 2E). Aluminum, molybdenum, titanium have desirable qualities and are suitable for use as the material for the metal thin-film 27.

Figure 2F:
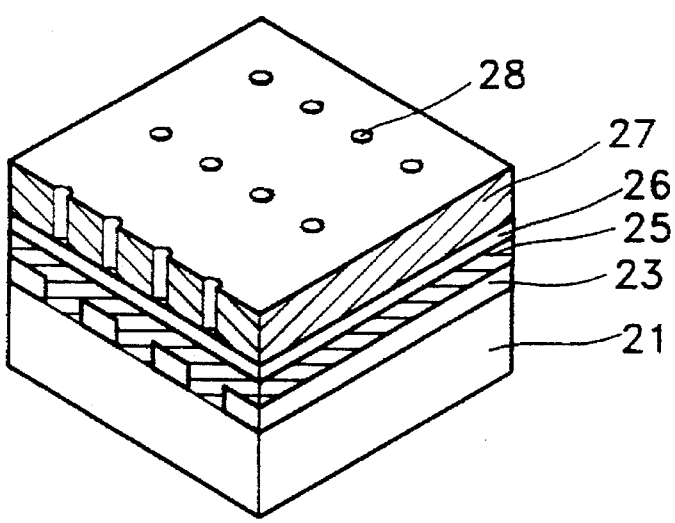
Figure 2G:
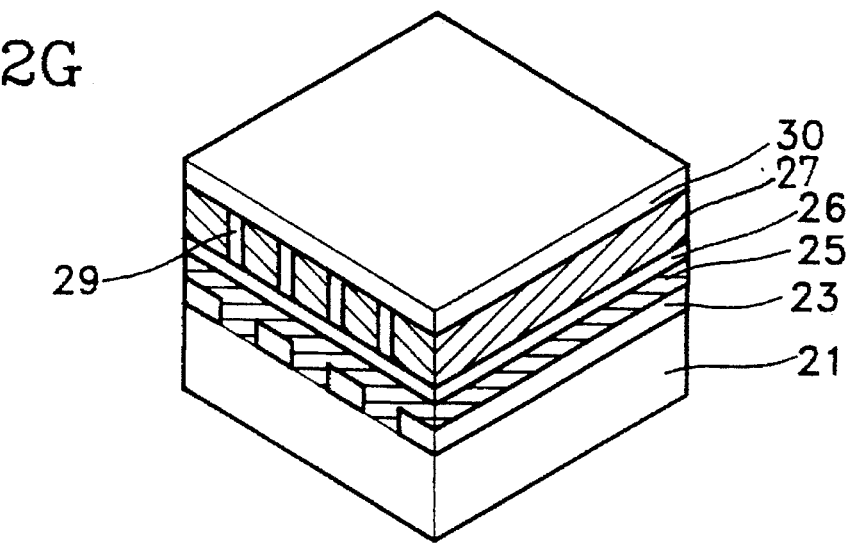

Subsequently, holes 28 are formed in the thin-film layer 27 by etching the metal thin-film layer to form a cell gap support which acts as a spacer(FIG. 2F). Thereafter, using the CVD method, cell gap supports 29 are formed by filling the holes 28 in the metal thin-film 27 with a light transmitting material, such as $SiO_2$ or $Si_3N_4$, and at the same time an upper insulation layer 30 is formed as a $SiO_2$ or $Si_3N_4$ thin-film having a thickness of 2 to 10 μm on top of the metal thin-film (FIG. 2G).

When the upper insulation layer 30 is formed, a second electrode pattern 31 is formed on top of the upper insulation layer. Subsequently, a liquid crystal injecting hole 32 is formed by reactive ion etching (RIE) or wet etching. Here, by dissolving the metal thin-film layer 27 utilizing a wet etching method, a uniform cell gap for the liquid crystal 33 is formed in the space formerly occupied by the metal thin-film (FIG. 2H).

Finally, a liquid crystal material 35 is injected into the cell gap formed and the liquid crystal injecting hole 32 is sealed off using the CVD method. Then, a protection layer 34 for protecting the upper electrode pattern is formed. A light transmitting insulating material, such as $SiO_2$ or $Si_3N_4$, is desirable for the protection layer. Through this method, a thin-film liquid crystal display panel is completed (FIG. 2I).

If the method of the present invention is used to manufacture a liquid crystal display panel, the following results are obtained:

First, the thickness of cell gap can be more accurately controlled by a thin-film forming process used for manufacturing semiconductor devices to form the cell gap for injecting a liquid crystal, thereby obtaining a uniform liquid crystal layer; and Second, equally arranged spacers as well as reduced weight are accomplished due to the upper cell gap protecting layer and a spacer for supporting the cell gap being formed with a thin film in sequence.

Accordingly, a liquid crystal display panel manufactured according to the present invention will provide an excellent liquid crystal driving capability and the performance thereof will be improved.

What is claimed is:

1. A thin-film liquid crystal display panel comprising:

a substrate;

a first electrode pattern disposed on the substrate;

a first electrically insulating layer disposed on the first electrode pattern and the substrate;

an alignment layer disposed on the first electrically insulating layer;

a plurality of spaced apart electrically insulating cell gap supports protruding from the alignment layer;

a second electrically insulating layer disposed on the plurality of cell gap supports, the second insulating layer and the cell gap supports being of the same material;

a liquid crystal material layer disposed between the alignment layer and the second electrically insulating layer adjacent the cell gap supports;

a second electrode pattern disposed on the second insulating layer;

a protective layer disposed on the second electrode pattern.

2. The thin-film liquid crystal display panel as claimed in claim 1 wherein the second insulating layer comprises a light transmitting material selected from the group consisting of $SiO_2$ and $Si_3N_4$.

3. The thin-film liquid crystal display panel as claimed in claim 1 wherein the first electrically insulating layer is $SiO_2$.

4. The thin-film liquid crystal display panel as claimed in claim 1 wherein the alignment layer is polyimide.

5. The thin-film liquid crystal display panel as claimed in claim 1 wherein the plurality of cell gap supports comprise a light transmitting material selected from the group consisting of $SiO_2$ and $Si_3N_4$.

6. The thin-film liquid crystal display panel as claimed in claim 1 wherein the protective layer comprises a light transmitting, electrically insulating material selected from the group consisting of $SiO_2$ and $Si_3N_4$.

7. A method for manufacturing a thin-film liquid crystal display panel, comprising:

forming a first electrode pattern on a substrate;

forming a first electrically insulating layer on the first electrode pattern and on the substrate;

forming an alignment film on the first electrically insulating film;

forming a metal film on the alignment film;

forming a plurality of holes extending toward the alignment film in the metal film;

filling the plurality of holes with a light transmitting material, and forming a second electrically insulating layer on the metal film;

forming a second electrode pattern on the upper insulating layer;

forming a liquid crystal material injecting hole in the second electrode pattern and the second electrically insulating layer extending to the metal film;

dissolving the metal film to form a cell gap between the alignment layer and the second electrically insulating layer;

injecting a liquid crystal material into the cell gap; and forming a protection layer over the liquid crystal injecting hole and covering the second electrode pattern.

8. The method for manufacturing a thin-film liquid crystal display panel as claimed in claim 7 wherein the metal film is selected from the group consisting of aluminum, molybdenum, and titanium.

9. The method for manufacturing a thin-film liquid crystal display as claimed in claim 7 wherein the second electrically insulating layer comprises a light transmitting material selected from the group consisting of $SiO_2$ and $Si_3N_4$.

* * * * *